United States Patent [19]
Abbott et al.

[11] Patent Number: 5,476,640
[45] Date of Patent: Dec. 19, 1995

[54] LOW TEMPERATURE DESTRUCTION OF TOXICS IN POLLUTANT AIR STREAMS

[75] Inventors: James H. Abbott; Dennis C. Drehmel, both of Cary; Geddes H. Ramsey, Chapel Hill, all of N.C.

[73] Assignee: The United States of America as represented by the Administrator of the U.S. Environmental Protection Agency, Washington, D.C.

[21] Appl. No.: 296,110

[22] Filed: Aug. 25, 1994

[51] Int. Cl.⁶ .............................. B01D 50/00; F01N 3/10
[52] U.S. Cl. .................. 422/171; 422/173; 422/177; 422/179; 422/196; 422/197; 422/198
[58] Field of Search .......................... 422/171, 173, 422/177, 179, 196, 197, 198, 192; 110/235, 238

[56] References Cited

U.S. PATENT DOCUMENTS

| | | | |
|---|---|---|---|
| 4,223,614 | 9/1980 | Barkhuus et al. | 110/238 |
| 4,384,536 | 5/1983 | Biswas | 110/342 |
| 4,421,037 | 12/1983 | Leam | 110/238 |
| 4,481,891 | 11/1984 | Takeshita et al. | 110/238 |
| 4,529,374 | 7/1985 | Malik et al. | 431/7 |
| 4,615,285 | 10/1986 | Bentell et al. | 110/346 |
| 4,646,660 | 3/1987 | Björkman et al. | 110/210 |
| 4,670,226 | 6/1987 | Furuyama et al. | 422/216 |
| 4,711,185 | 12/1987 | Hofmann et al. | 110/215 |
| 4,755,138 | 7/1988 | Owen et al. | 432/58 |
| 4,823,711 | 4/1989 | Kroneberger et al. | 110/236 |
| 4,979,448 | 12/1990 | Sheely et al. | 110/346 |
| 5,084,247 | 1/1992 | Heisel et al. | 422/200 |
| 5,165,884 | 11/1992 | Martin et al. | 431/7 |
| 5,275,790 | 1/1994 | Buchholz et al. | 422/217 |

*Primary Examiner*—Robert J. Warden
*Assistant Examiner*—N. Bhat
*Attorney, Agent, or Firm*—Irving M. Freedman

[57] ABSTRACT

Low temperature apparatus for the destruction of low volume time varying organic air toxins in air streams utilizing non-catalytic glass beads in parallel conduits heated by hot gas flow around the conduits and flowing the air stream through the conduits and controlling the hot gas flow in response to toxin levels in the air stream.

14 Claims, 2 Drawing Sheets

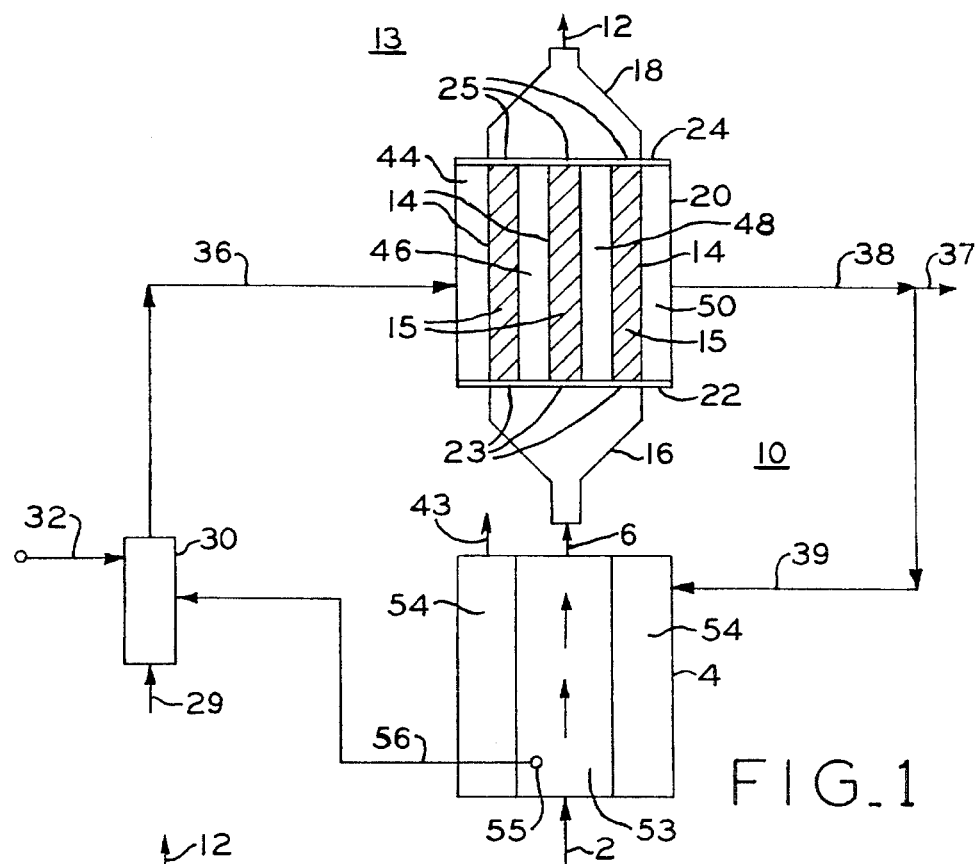
FIG_1
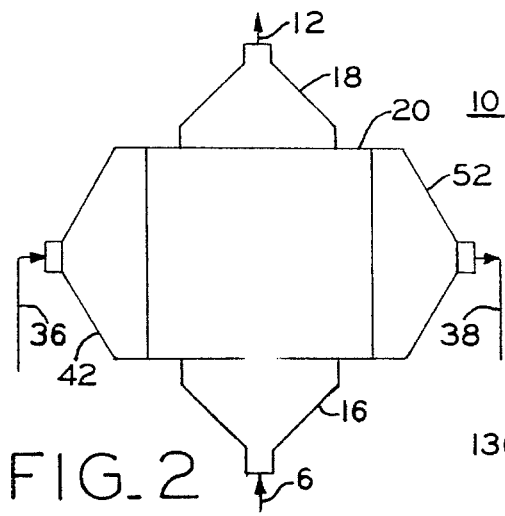
FIG_2
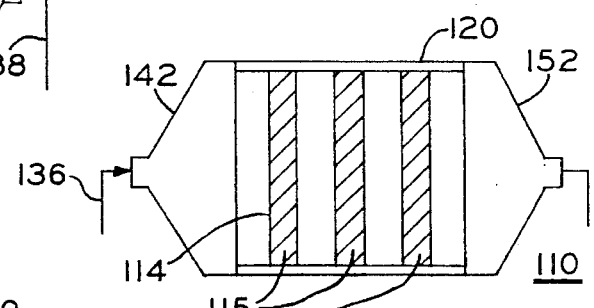
FIG_4
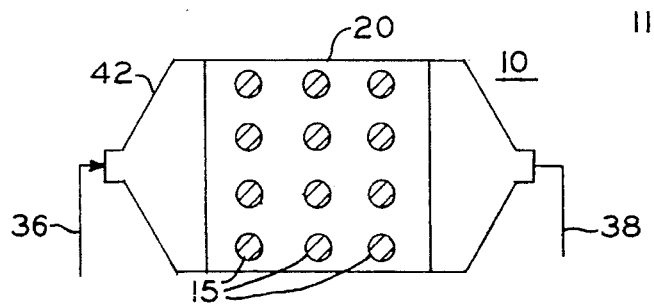
FIG_3

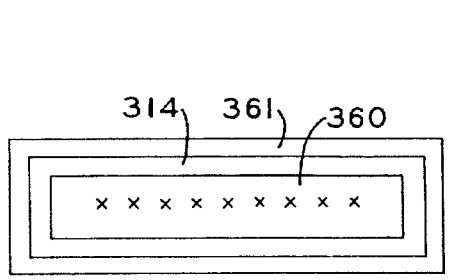
FIG_6
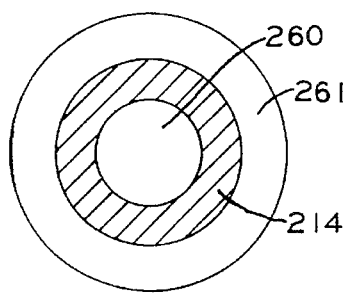
FIG_7
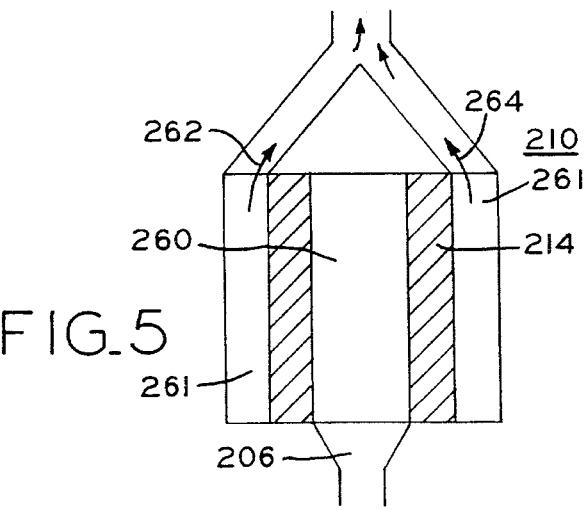
FIG.5
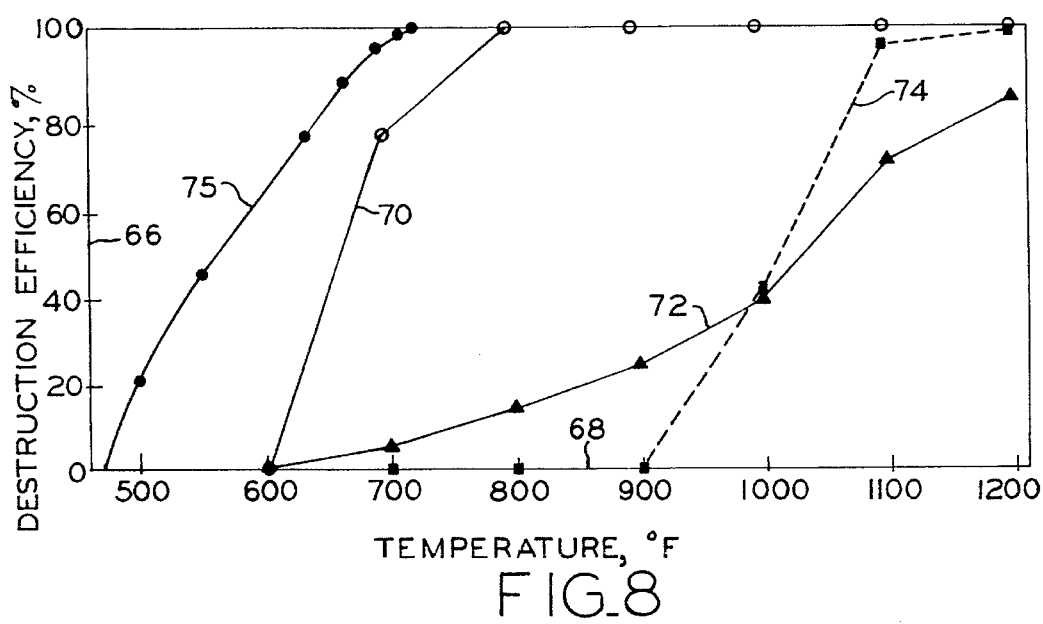
FIG.8

LOW TEMPERATURE DESTRUCTION OF TOXICS IN POLLUTANT AIR STREAMS

BACKGROUND OF INVENTION

There has been a recent growing concern over the pollution of the earth by volatile organic compounds (hereinafter VOCs) and organic air toxics emitted by large and small industrial operations, air stripping of ground water, and innumerable small area sources such as paint spray booths and degreasing operations. Many of the VOCs and organic air toxics are believed to contribute to tropospheric ozone non-attainment, toxic effects from exposure to hazardous air pollutants, ozone layer destruction, and global climate change. Considerable research and development efforts have been directed at the destruction of such pollutants.

The destruction of a broad range of VOCs and air toxics in industrial gas streams and from area sources has been greatly complicated by the fact that the industries and sources of such pollutants may be operating on a continuous or batch process in which there may be time periods where there are large volumes of polluted gas to be treated, where there are periods where there is no gas emission, and where there may be varying levels of pollutants with time. A suitable destruction process must be able to follow such process cycles. Conventional technology such as high temperature incineration requires the use of high temperature ceramics for insulation which does not readily withstand, and is subject to severe damage in the presence of, repeated cycling over broad temperature ranges.

Accordingly, it is highly desirable that a practical destruction process operate at as low a temperature as possible in order to minimize the need for expensive insulation or the requirement to repeatedly replace such insulation and furthermore in order to provide a process which is economical in its power or heating requirements.

An additional problem encountered in the destruction of VOCs and organic air toxics in air streams is to obtain efficient destruction with low concentrations of pollutants and/or with high volume gas streams. Under such conditions conventional known control technologies do not provide an efficient and economical operation.

OBJECTS AND SUMMARY OF INVENTION

It is an object of the present invention to provide apparatus for the destruction of VOCs and air toxic pollutants in gas streams which is suitable for use where the pollutants are present in low concentrations.

It is another object of the present invention to provide apparatus for the destruction of pollutants in gas streams which break the pollutants down to innocuous compounds which are non-toxic and non-hazardous.

It is still another object of the present invention to provide apparatus for the destruction of pollutants in gas streams which is suitable with either continuous or batch operations, and is capable of following process cycles.

It is a further object of the present invention to provide apparatus for destruction of pollutants in gas streams which utilizes low temperatures to avoid the use or damage to high temperature insulations and avoid high energy costs.

It is a yet further object of the present invention to provide apparatus for the destruction of pollutants in gas streams which can be effectively utilized for low concentration pollutants and/or high volume gas streams.

In accordance with one form of the present invention low temperature apparatus for the destruction of variable organic air toxics in a polluted air stream which is suitable for cyclical operation includes a reactor with at least one bed filled with non-catalytic members and means to direct the polluted air stream through the beds. Heating means such as a heated gas flow is separated from, but used to, heat the bed in response to a presence in the air stream of pollutants which exceed a predetermined level such that the polluted air stream reacts with the heated non-catalytic members to remove air toxins from the air stream to provide a clean air stream which is subsequently passed to the surrounding atmosphere. A plurality of beds may be connected in parallel and a manifold provided to direct the polluted air stream through the plurality of beds, and the non-catalytic members may be glass beads or metal beads. A control which operates at a preselected level of air toxins in the air stream heats the glass beads to a temperature in the range of 800°–1200° F. The non-catalytic beds may be of variable cross-section configurations transverse to the flow of the polluted air stream including circular, rectangular and ring-shaped. A preheater may be applied to the polluted air stream utilizing heat extracted from the heated gas after it passes around the beds and is recycled to the preheater.

BRIEF DESCRIPTION OF DRAWINGS

FIG. 1 shows apparatus including the present invention and is partially in cross-section.

FIG. 2 is a side view of FIG. 1.

FIG. 3 is a cross sectional bottom view of FIG. 2 taken along lines 3—3 of FIG. 2.

FIG. 4 is a cross sectional bottom view of a rectangular passage configuration in lieu of the tubular configuration of the reactor shown in FIGS. 1–3.

FIG. 5 and 7 show alternate cross sectional configurations of the reactor in FIG. 1.

FIG. 6 is the top view of a cross-section of FIG. 6.

FIG. 8 is a plot showing operation of the present invention with glass beads, stainless steel and copper beads.

DETAILED DESCRIPTION OF INVENTION

Referring first to FIGS. 1–3, a contaminated air stream 2 carrying variable amounts of organic air toxins such as VOCs and air toxics is passed through preheater 4. The preheated air stream 6 is then passed through reactor 10 to destroy the air toxins as described in detail below and is subsequently emitted as clean air stream 12 into the surrounding atmosphere 13. Reactor 10 includes diffuser or manifold 16 where the preheated contaminated air stream 6 is separated to pass through a plurality of parallel conduits 14 each filled with beads or members 15, which may be non-catalytic members such as ceramic or glass beads; or alternatively with metal beads; with the beads such as stainless steel and copper selected from the transition metals of the fourth period of the periodic table and having a diameter in the range of 1 millimeter (mm) to 25 mm. Stainless steel or copper beads 15 tend to have a longer life and are less expensive than typical catalytic control devices. Moreover, reactor 10 operates more efficiently, and exhibits catalytic properties which enhances the oxidation reaction as compared with the ceramic or gas beads.

The plurality of parallel conduits 14 are retained in place within shell 20 of reactor 10 by retainers 22 and 24 which include screened apertures 23 at the ends of parallel conduits 15 to retain beads 15 within the parallel conduits.

The clean air stream 12 after exiting screened apertures 25 passes through header or manifold 18 of low temperature thermoreactor 10 where it then passes to surrounding atmosphere 13.

Non-catalytic members 15 within parallel conduits 14 are heated by a heated air flow 36 which is passed through gas passages such as 48 and 50 which surround the parallel conduits. Air flow 29 is first passed through heater or burner 30 which is heated by electrical means, natural gas or propane 32 in burner 30. Heated gas flow 36 is passed through diffuser manifold 42 to flow around parallel conduits 14 to heat the non-catalytic beads contained within the parallel conduits through which the contaminated gas flow passes to collector manifold 52 where a portion 37 may be released to surrounding atmosphere 13. Another portion is provided as preheat air 39 to pass through annular passage 54 surrounding preheat chamber 53 through which contaminated air stream 2 passes prior to being provided to low temperature thermoreactor 10, after which the preheated air is exhausted into surrounding atmosphere 13 as indicated by arrow 43.

A pollutant sensor 55 positioned within preheat chamber 53 senses the presence and level of pollutants in contaminated air stream 2 to provide burner control signal 56 to turn burner 30 on in response to pollutants which exceed a preselected level. As a result, the low temperature thermoreactor 10 is provided with heated air 36 only during those periods in which the level of pollutants in contaminated air stream 2 exceeds a predetermined level. In utilizing the present invention it has been found that the non-catalytic beads 15 need only be heated to a temperature in the range of 400°–1200° F. for effective destruction of variable organic air toxins including VOCs and air toxics. It is to be noted that the plurality of parallel conduits 14 are separated from each other and from the outer shell of low temperature thermoreactor 10 such that the necessity for high temperature insulation for the reactor has been eliminated. This is particularly important in the present invention where the heat provided by burner 30 is cycled, and turned off during those periods in batch or variable industrial processes where the level of pollutants in air stream 2 is below a safe predetermined level. It is to be further noted that a present apparatus does not require the high temperature incineration operation. In such prior art devices operating at high temperatures, it has been found that the insulations required, such as ceramic insulation, are frequently damaged by repeated temperature cycles from ambient temperature to high temperatures such that many conventional high temperature processes simply maintain the high temperature even in the presence of low and variable levels of pollutants. While such operation avoids damage to the ceramic insulation resulting from cyclical operation, it greatly increases the cost of operation and the consumption of energy for heating and maintaining the high temperatures. This in itself adds to air pollution and depletes non-renewable natural resources such as natural gas or fossil fuels.

The present invention provides organic air toxics destruction at reasonably low temperatures and with low gas stream resident times in reactor 10 of as little as one second. Moreover, the apparatus of the present invention is inexpensive, uncomplex and easy to maintain. It is practical and inexpensive for the destruction of VOCs and organic air toxins in low concentrations, situations in which the cost of conventional thermal incineration becomes prohibitively high. While prior art catalytic incineration does not require temperatures as high as thermal incineration, its performance is substantially degraded when applied to high volume and/or low volume gas streams of variable magnitudes and times. Moreover, the catalyst in such systems are often poisoned or degraded by chlorinated compounds and the impurities in the gas streams.

Alternate means for treating VOCs and organic air toxics such as adsorption on a material such as activated carbon is also not effective for low concentration gas streams, and more important if the pollutant is an organic air toxin which is not destroyed it remains on the carbon such that the carbon disposal becomes a problem. If the pollutant is regenerated off the carbon it will be at a higher concentration and will still require some further expense and provide environmental problems in destroying or ultimately disposing of the organic air toxic.

Conventional thermo-incinerators which operate at much higher temperatures than the present invention are not as highly effective from an energy efficient standpoint, particularly when treating low concentration gas streams, and present problems in cycling such high temperatures in the presence of batch or varying levels of pollutants and gas streams.

The total enclosure of the heat source within low temperature reactor 10 maximizes the energy efficiency and minimizes the need for thermal insulation. Moreover, it avoids the potentially brittle insulation problems which are particularly acute in on/off cyclical modes of operation at high temperatures incineration of batch industrial process pollutants.

Contaminated gas conduits 14 may be of differing configurations which can provide differences in ease of construction, maintenance and use. FIGS. 1–3 illustrate a configuration in which twelve parallel conduits 14 are circular in cross-section. Manifold 16 directs a portion of preheated contaminated air stream 6 through each conduit providing a relatively even flow and usage such that the non-catalytic beads 15 in each conduit will need maintenance and/or cleaning at approximately the same time. However, other configurations are equally effective and may be cheaper to manufacture, install and maintain, although maintenance periods may differ. Such a configuration is shown in FIG. 4 which illustrates three conduits of rectangular cross-section occupying the space otherwise occupied by the three rows of tubular conduits of circular cross-section shown in FIGS. 1–3.

FIGS. 5 and 6 show a reactor 10 configuration in which a single conduit having a cross-section of donut or ring shape 214 formed by a pair of parallel circular cylinders 261 and 262. Preheated contaminated air stream 206 may be passed through the central region 260 within the low temperature reactor 210, or alternatively, or in addition, passed around the outside of conduit 214 as shown by arrows 262 and 264.

FIG. 7 illustrates a ring of rectangular cross-section.

FIG. 8 illustrates the increased destruction efficiency invention, of the present invention as proved by laboratory testing. FIG. 8 shows the destruction efficiency of the present invention, both glass and stainless steel beads 15. Reactor 10 utilized stainless steel beads or spheres for plot 70 which shows the destruction efficiency of the reactor as regards toluene. It is to be noted that substantially 100% destruction efficiency is realized at relatively low temperatures 68 of less than 800 F. Beads 15 of glass were used in reactor 10 for the testing which resulted in plot 72 which shows the destruction efficiency 66 of the reactor as regards toluene. The destruction efficiency of plot 72 while suitable for use, is less than that of plot 70, and one which required considerably more heat. Beads 15 of glass were used in reactor 10 for the testing which resulted in plot 74, which shows the destruction efficiency 66 of the reactor as regards methylene chloride. As shown by plot 74 reactor 10 with glass beads is very effective as regards methylene chloride, but a temperature 68 in excess of 1000 degrees Fahrenheit is required for substantially 100% destruction efficiency.

Copper bead provided the best destruction efficiency. As shown by plot 75 the use of copper beads provided destruction efficiency 66 for toluene with substantially 100% destruction efficiency at a temperature of approximately 700 degrees Fahrenheit. Moreover, the residence time in the case of the copper beads was only 2 seconds.

While copper beads 15 are superior in the destruction of toluene, the presence of chlorine in pollutants such as methyl chloride can result in the formation of HCl acid which is corrosive and which can damage the copper beads. With such pollutants stainless steel beads are preferable as being more corrosion resistant and for longer life.

Various stainless steel alloys such as 316 stainless steel and 304 stainless steel were tested giving substantially similar destruction efficiency plots although the 304 stainless steel was slightly better than the 316 stainless steel. Stainless steel, of course, is an alloy which includes iron, nickel, and chrome, three transitional metals of the fourth period of the periodic table indicating the possibility of tailoring the alloys both as to metals and percentages, to provide maximum destruction efficiency for a particular pollutant of particular concern in a particular type of waste or industrial process to which the subject invention is applied. The transitional metal members of group four are scandium, titanium, vanadium, chromium, manganese, iron, cobalt, nickel, copper, and zinc. The metal or metals selected and their relative proportions will also depend on the costs of the metals, along with the destruction efficiency and life.

In the testing which provided plots 70, 72, and 74, 107 parts per million of pollutant (toluene or methylene chloride) in a gas flow of 450 milliliters per minute was used with a 3 second residence time of the gas flow in reactor 10.

While specific embodiments of the present invention have been described, it will be understood that modifications and further refinements may be made by those skilled in the art, including the application of the system and apparatus to other contaminants and the use of alternate component configurations, and it is intended by the appended claims to cover all such modification and changes as for within the true spirit and scope of the invention.

What we claim is:

1. Low temperature apparatus for the destruction of variable levels including low levels of organic air toxins in a polluted air stream and suitable for cyclical operation comprising:

a reactor including at least one bed containing a plurality of contiguous metal members members selected from the group consisting of the transitional metals of the fourth period of the periodic table and stainless steel;

means to direct said polluted air stream through said at least one bed;

means separated from said at least one bed to indirectly heat said at least one bed in response to the presence of said organic air toxins;

said polluted air stream reacting with said heated contiguous members to remove said air toxins from said air stream to provide a cleaned air stream; and a passageway connecting said reactor to the surrounding atmosphere to pass said cleaned air stream to the atmosphere.

2. The apparatus of claim 1 wherein said at least one bed includes a plurality of beds connected in parallel and a manifold is provided to connect portions of said polluted air stream through said plurality of beds.

3. The apparatus of claim 1 wherein said means to heat said at least one bed further includes means to sense the level of said organic air toxins in said air stream and a control responsive to said means to sense.

4. The apparatus of claim 3 wherein said contiguous members are stainless steel and said temperature is approximately 800° F.

5. The apparatus of claim 3 wherein said polluted air stream passed sequentially through a preheater and then through said bed, and said means to heat passes a heated gas through a passage surrounding said tubular members to provide said indirect heating.

6. The apparatus of claim 1 wherein said at least one bed is positioned within one of a pair of concentric spaced tubular members to provide a gas flow path contiguous to, but separated from, said at least one bed; and means to provide a heated gas flow through said contiguous gas flow path to separate said heated gas flow from said air flow to avoid adding said heated gas flow to the flow through said bed.

7. The apparatus of claim 1 wherein said sensor can detect the presence of air toxins above a preselected level of air toxins in said air stream, and control means to turn said means to heat on until the level of toxins drops below said preselected level to provide cyclical operation of said apparatus responsive to said variable levels of organic air toxins and to heat said bed below the ignition temperature of said air toxins in order to minimize the power input requirements of said apparatus.

8. The apparatus of claim 7, wherein said contiguous members are stainless steel beads heated to a temperature above approximately 400° Fahrenheit.

9. A low power low temperature apparatus for the destruction of variable low levels of air toxins in a polluted air stream comprising:

a reactor including at least one bed packed with at least one metal member selected from the group consisting of transitional metals of the fourth period of the periodic table and stainless steel;

means to pass said polluted air stream through said packed bed;

a sensor in said air stream to sense the level of toxins in said air stream;

means to indirectly heat said polluted air stream in response to levels of air toxins which exceed a preselected level without adding to the volume of said air stream;

said air stream reacting with said heated packed bed to remove said air toxins from said air stream to provide a clean air stream; and a passageway connecting said clean air stream to the outside of said reactor.

10. The apparatus of claim 9 wherein said means to heat said apparatus includes a heated gas stream surrounding but separated from said packed bed to provide the indirect heating of said packed bed, and means to conduct at least some of said heated gas stream after passing by said packed bed to a preheater to indirectly preheat said polluted air stream before said polluted air stream passes through said reactor.

11. A low power low temperature apparatus for the destruction of variable air toxins in a polluted air stream comprising:

a reactor including at least one bed packed with metal members selected from the transitional metals of the fourth period of the periodic table and stainless steel;

means to pass said polluted air stream through said packed bed;

means to heat said polluted air stream in response to levels of air toxins which exceed a preselected level;

said air stream reacting with said heated packed bed to remove said air toxins from said air stream to provide a clean air stream;

a passageway connecting said clean air stream to the outside of said reactor;

wherein said means to heat said apparatus includes a heated gas stream surrounding but separated from said packed bed and means to conduct at least some of said heated gas stream after passing by said packed bed to a preheater which preheats said polluted air stream before said polluted air stream passes through said reactor; and including a sensor to detect the level of air toxins in said polluted air stream and means to generate a control signal to energize said means to heat said polluted air stream to a predetermined temperature in excess of approximately 800° Fahrenheit in response to those levels of pollutants which exceed a predetermined level.

12. The apparatus of claim 11 wherein said means to heat said polluted air stream includes a gas flow which is heated to provide said heated gas stream.

13. The apparatus of claim 12 wherein said gas flow is a controlled air flow.

14. The apparatus of claim 13 wherein said at least one packed bed has a cross section transverse to said air flow which is selected from the group consisting of circular, rectangular and ring.

* * * * *